US008818723B2

(12) United States Patent
Schuh et al.

(10) Patent No.: US 8,818,723 B2
(45) Date of Patent: Aug. 26, 2014

(54) LOCALIZATION AND TRACKING SYSTEM FOR MOBILE ROBOTS

(75) Inventors: Andreas Schuh, San Francisco, CA (US); Kamal Youcef-Toumi, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 213 days.

(21) Appl. No.: 13/594,962

(22) Filed: Aug. 27, 2012

(65) Prior Publication Data
US 2014/0058667 A1     Feb. 27, 2014

(51) Int. Cl.
*G01S 17/06*      (2006.01)

(52) U.S. Cl.
USPC .......... 701/514; 701/408; 701/523; 356/4.01; 356/4.03; 356/482; 356/508

(58) Field of Classification Search
USPC ........ 701/514, 408, 523, 526; 356/3.01–5.15, 356/482, 497, 500, 508; 396/34, 106
See application file for complete search history.

(56) References Cited

U.S. PATENT DOCUMENTS

| | | | | |
|---|---|---|---|---|
| 4,386,848 | A * | 6/1983 | Clendenin et al. | 356/5.01 |
| 4,672,564 | A | 6/1987 | Egli | |
| 6,587,183 | B1 | 7/2003 | Uomori et al. | |
| 6,704,099 | B2 * | 3/2004 | Uomori et al. | 356/4.01 |
| 6,975,361 | B2 * | 12/2005 | Kamon et al. | 348/375 |
| 8,120,780 | B2 | 2/2012 | Bridges | |

OTHER PUBLICATIONS

Yoon, Sugpil; Lundberg, J. B., Equations of motion for a two-axes gimbal system, J. B. IEEE Transactions on Aerospace and Electronic Systems, vol. 37, issue 3, pp. 1083-1091, 2001.
S.B. Kim, S.H. Kim, and Y.K. Kwak, Robust control for a two-axis gimbaled sensor system with multivariable feedback systems, IET Control Theory Appl. 4, 539 (2010).
Locke Michael, Czarnomski Mariusz, Qadir Ashraf, Setness Brock, Baer Nicolai, Meyer Jennifer, Semke William, High-performance two-axis gimbal system for free space laser communications onboard unmanned aircraft systems, Proceedings of SPIE—The International Society for Optical Engineering [Proc. SPIE Int. Soc. Opt. Eng.]. vol. 7923, [np]. 2011.
Bennett Wilburn, Neel Joshi, Vaibhav Vaish, Marc Levoy, and Mark Horowitz, High-Speed videography using a dense camera array, In Proceeding of the 2004 IEEE computer society conference on Computer vision and pattern recognition (CVPR'04). IEEE Computer Society, Washington, DC, USA, 294-301.
Jae S. Lim, Prentice Hall PTR, Two-Dimentional Signal and Image Processing, PTR; Facsimile edition (Sep. 11, 1989).
Andrew W. Fitzgibbon, Maurizio Pilu, and Robert B. Fisher, Direct least-squares fitting of ellipses, IEEE Transactions on Pattern Analysis and Machine Intelligence, 21(5), 476-480, May 1999.

(Continued)

*Primary Examiner* — Richard Camby
(74) *Attorney, Agent, or Firm* — Sam Pasternack; MIT Technology Licensing Office (57) ABSTRACT

Localization and tracking system. The system includes at least one laser mounted for pointing its beam at arbitrary locations within a three-dimensional space. An object within the three-dimensional space supports a screen at its top for receiving the laser beam to create a shaped image on the screen. The shaped image on the screen is observed by a camera and computing apparatus determines the location of the object in the three-dimensional space from pointing parameters of the laser and from shape and center points of the shaped image on the screen.

8 Claims, 6 Drawing Sheets

(56) References Cited

OTHER PUBLICATIONS

G. Taubin, "Estimation of Planar Curves, Surfaces, and Nonplanar Space Curves Defined by Implicit Equations with Applications to Edge and Range Image Segmentation," IEEE Transactions on Pattern Analysis and Machine Intelligence, pp. 1115-1138, Nov. 1991.

E. E. Zelniker, Maximum-likelihood estimation of circle parameters via convolution, I. V. L. Clarkson Image Processing, IEEE Transactions on in Image Processing, IEEE Transactions on, vol. 15, No. 4. (2006), pp. 865-876.

International Search Report PCT/US13/55905 mailed on Jan. 29, 2014.

* cited by examiner

LOCALIZATION AND TRACKING SYSTEM FOR MOBILE ROBOTS

BACKGROUND OF THE INVENTION

This invention relates to localization and tracking systems for mobile robots having particular application to inspection of large, three-dimensional structures such as liquefied petroleum gas tanks.

Liquefied Natural-petroleum Gas (LNG) and Liquefied Petroleum Gas (LPG) are often stored in vast tanks measuring up to 60 m in height and 100 m in diameter. During normal operation, they are cooled to −162° to keep the contained gas liquefied. These tanks must be inspected and maintained regularly by humans, resulting in extended warm-up times for reaching adequate temperatures. Accelerating the shutdown period is indispensable for lowering the cost of such operations and can be achieved by using mobile robot platforms, which are sent into the tanks at much lower temperatures. These robots are equipped with inspection sensors and are proposed to replace the need for humans in such a hazardous environment.

Localization and tracking of the mobile robots inside the tank is necessary to ensure comprehensive inspection. Mud forms at the bottom of the tanks and can cause the robot's wheels to slip. This makes tracking techniques solely based on integration methods, such as wheel encoders, unreliable. An absolute measurement system is mandatory, and while wireless radio frequency techniques like the Global Positioning System (GPS) are not allowed by regulations, lasers offer a possible solution. One option is to point with the laser in front of the robot and monitor the reflected light with a camera, letting the robot chase the laser spot. Alternatively, a lightsensitive sensor array can be placed on top of the robot. A coordinate system can be formed by placing its origin at the midpoint of the sensor array. The local distance between laser point and origin of the coordinate system can form an error signal for tracking and control purposes. The first method has the disadvantage of directing the laser into the mud, which can absorb the light and make it difficult to track. Light sensitive sensors, commonly made out of semi-conducting devices, are expensive at larger scales.

SUMMARY OF THE INVENTION

The localization and tracking system according to the invention includes at least one laser mounted for pointing its beam at arbitrary locations within a three-dimensional space. An object in the three-dimensional space supports a screen at its top for receiving the laser beam to create a shaped image on the screen. A camera is provided for observing the shaped image on the screen and computing apparatus determines location of the object in the three-dimensional space from pointing parameters of the laser and from shape and center points of the shaped image on the screen. In a preferred embodiment, the at least one laser is mounted in a gimbal system having two rotating axes. Two lasers may be used to generate two images having different shapes and/or colors. The shaped images may be selected from the group consisting of circles, squares, semicircles, and rectangles. In a particularly preferred embodiment, the object is a mobile robot.

In one embodiment, the computing apparatus fits an ellipse to data points of the shaped image.

DESCRIPTION OF THE PREFERRED EMBODIMENT

The tracking system disclosed herein is based on lasers that are tracked with a camera system. Opposed to the concepts described earlier, this system combines them by using a camera setup on top of the robot facing upwards. The laser is tracked while it hits a screen positioned above the camera and the signal is used to generate the tracking information. A two axis gimbal 75 system guides the laser anywhere inside the tank. Certain translational and rotational information can be derived from this system and allows local and global, non-incrementing localization of the robot.

FIG. 1a shows the overall concept of the tracking and localization system. A gimbal system, shown to the right of the robot, consists of two rotating axes. We will call the axis 80 described by the angle θ "major axis" and the one described by Σ "minor axis". The laser is attached to the minor axis and thus can be directed anywhere inside the LNG/LPG tank. The laser beam targets the screen on top of the camera at an angle of δ while the robot is facing along the y-axis. FIG. 1b shows a model of a rigid body to indicate the robot's six DOF. Indicated are the translational positions X, Y and Z as well as the rotational positions Ψ (pitch), Ω (roll) and Φ (yaw). Control of X and Y is needed to move the robot at the bottom of the tank. Since the robot also needs to inspect some of the lower part of the tank's wall, control over Z is needed. The yaw can be obtained by using gyroscopes; unfortunately they are prone to noise.

Figure 2:
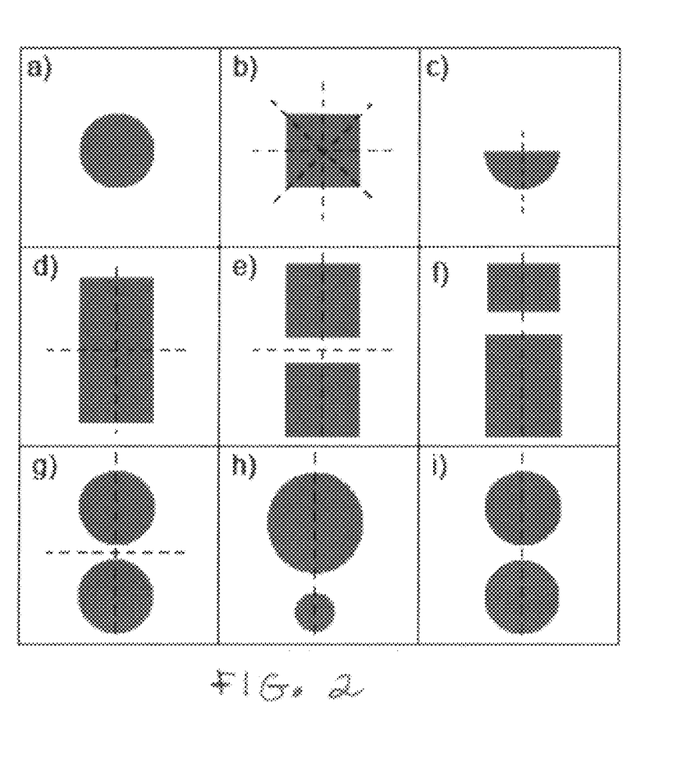
FIGS. 2a-i are illustrations of different laser spot configurations and shapes that are suitable for use with the invention. Dashed lines indicate symmetric lines of the constructed figure in each block.

The following discussion outlines the potential information that can be obtained from different laser configurations, by either using different beam shapes or by using two or more lasers. FIG. 2 shows a selection of potential created shapes on top of the detector screen. The (lashed lines indicate the symmetric lines of each shape inside the blocks (a) to (i). The created shapes on the screen with respect to a defined center point yields information such as the direction and speed of the robot motion.

From a spot-shaped laser (FIG. 2a) a tracking/localization signal for the desired X and Y positions of the robot can be generated. Obtaining the yaw information is not possible using this configuration. Since laser beams can have different shapes, FIG. 2(b) indicates a square that has four symmetric lines. Again, this case only allows similar ability tracking as the spot shape. FIG. (2c) shows a half circle and could be created by blocking half of a spot-shaped laser beam. Tracking in X and Y is possible, but the yaw is unique. This gives the robot the opportunity to gain information about its yaw inside the tank area with respect to the gimbal system thus offering global yaw localization. As indicated, only a single symmetric line exists in a half-circle in contrast to the previously discussed shapes. By inspecting FIG. (2d) a rectangular shape can track X and Y, but no information about the yaw can be obtained.

We conclude that tracking the translational positions X and Y does not require certain beam shapes and applies to all of the following shapes. In addition, one or less symmetrical lines within the shapes yield to a unique interpretation of the yaw.

Two laser beams of any shape reduce the symmetry of the resulting shapes to no more than two symmetric lines, as can be seen in FIGS. 2(e)-(i). Splitting the rectangular beam in FIG. 2(d) resulting in 2(e) contains the same amount of information as before. By not splitting the rectangular beam exactly along one of its symmetric lines, two different shapes are generated, meaning the yaw can be determined uniquely. Two laser beams can allow the detection of the pitch, roll and Z. When these variables change, the screen cuts the laser beams by different angles. This results in different distances of the single shapes from each other.

Reducing symmetries can be achieved not only by using different shapes, but also by colors. Using two different colored laser beams, as shown in FIG. 2(i), always leads to an unique interpretation of the yaw. Also, this is independent of the beam shapes.

For the remainder of this patent application we will use the two laser beam configuration with different colors. Later, it becomes clearer why this configuration, in particular, is advantageous. Also, the red laser spot will be used for tracking/guiding the robot in respect to the center point. In combination with the green laser, the discussed localization information is obtained.

Figure 3:
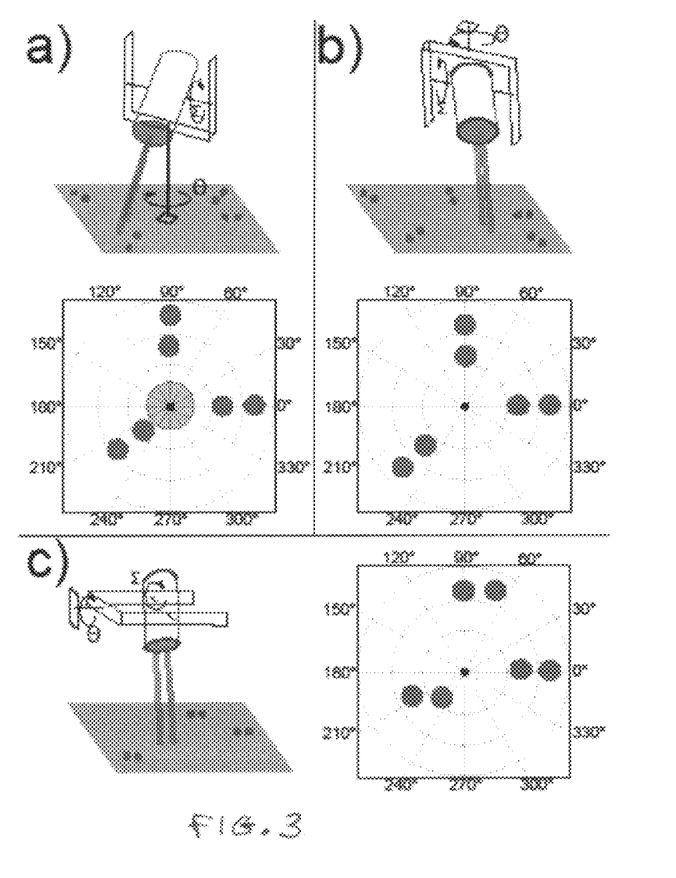
FIG. 3a is a schematic illustration of a gimbal configuration standing on a plane.
FIG. 3b is a schematic illustration of a gimbal configuration coming from the top.
FIG. 3c is a schematic illustration of a gimbal configuration mounted on a side wall.

We will now introduce a two DOF gimbal system with the attached lasers, representing yaw and pitch movements. We will discuss aspects to be considered as well as limitations of the system. The gimbal allows pointing the laser anywhere inside a 3-dimensional object and detailed dynamic models have been developed in the past [1, 2]. As an example, gimbal systems have also been used for laser communication systems on airplanes [3]. The configuration of the gimbal system is important to consider in order to achieve maximum benefit from the previous discussion on beam shapes. In FIG. 3(a), the gimbal is standing on the same plane on which the robot is moving. While directing the gimbal the two laser beams form circular movements, keeping the same (red) laser always closer to the gimbal center point. An area might exist where the gimbal cannot point to as indicated by a gray spot. FIG. 3(b) is a similar case where the gimbal is mounted above the tracking area. The gray zone disappears and the gimbal is able to cover the whole area. FIG. 3(c) turns the gimbal by 90° and the laser beams maintain a constant angle, thus always facing the same direction.

Figure 4:
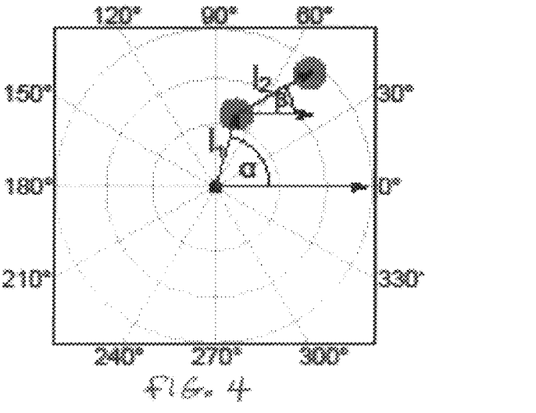
FIG. 4 is a polar coordinate system of the robot detector screen. Indicated are the center point, lengths to the laser spots and corresponding angles.

Based on this analysis, one can measure the angle β formed by the horizontal line and a vector connecting the two laser spots, as shown in FIG. 4. β can be obtained directly for the case in FIG. 3(c) and needs to be corrected for the two cases in FIGS. 3(a) and (b) as follows: The red laser spot is always located between the green spot and the center point. By defining the coordinate system of the robot and the gimbal to have the same orientation, thus e.g. 0° faces the exact same direction, the following equation gives the proper global yaw of the robot:

$$\Phi_g = \beta - \Theta. \tag{1}$$

The minimum rotating step size of the gimbal also determines the minimum step size that the laser can be moved on the detector screen, as shown in FIG. 4. $S_X$ and $S_Y$ are the minimum steps in X and Y, respectively, and S is the combined minimum step.

Figure 5:
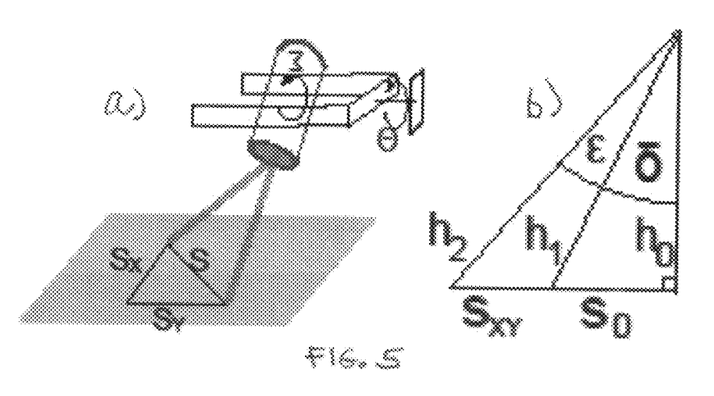
FIG. 5a is a schematic illustration showing the minimum achievable step size determined by the gimbal system.
FIG. 5b is a schematic illustration showing angle and distance relationships for each axis.

The relationships can be described according to FIG. 5. $h_1$ represents the actual beam length and $h_2$ the intended beam length at the new laser position, which is dependent on the actual position of the laser due to the angle between laser beam and plane. We define $S_{total,XY} = S_{XY} + S_{0,XY}$ and the distance $S_{XY}$ can be described by trigonometric functions as follows:

$$S_{XY} = S_{total,XY} - S_{0,XY} \tag{2}$$

$$= h_0(\tan(\varepsilon_{XY} + \delta_{XY}) - \tan(\delta_{XY})) \tag{3}$$

To obtain the minimum step size in the 2D-plane, S can be calculated as:

$$S = \sqrt{S_X^2 + S_Y^2} \tag{4}$$

For example, by using a SICK DFS60A incremental encoder with 65535 lines/rev, the minimum angle increment is 0.00551°. By letting $h_0$ be the tank height at 60 m and the laser beam at position $S_0$=50 m, the angle δ is 39.8056°. This results in a minimum $S_X$ and $S_Y$ step of approximately 1 cm and an S of 1.41 cm.

Localization of as many DOF as possible are desired to gain the best knowledge of the robot's position and movement inside the tanks. The described system allows access up to four DOF, both in a local and global sense. This will be described in more detail as follows.

Localization in the local sense means that the robot obtains information in respect to its own position, but not in respect to its environment such as a gas tank. As discussed earlier, translational movements $X_l$ and $Y_l$ are possible to detect in relation to the detection screen center point. The yaw $\Phi_l$ is defined in respect to the 0° angle of the robot only.

Global localization offers information about the robot in respect to its environment. The global translational movements $X_g$ and $Y_g$ are possible to detect, but the gimbal angle information of both axes is needed to determine the unique position of the robot. For accuracy reasons, the laser with the distance sensor can be taken into account additionally. Depending on configuration of the gimbal system the global yaw $\Phi_g$ is the same as the local yaw $\Phi_l$. If that is not the case, then the angle θ of the major gimbal axis needs to be taken into accounted. Global translational movement $Z_g$ is uniquely measurable in certain circumstances and if they are met, the robot can be tracked while it is possibly climbing up the walls. For a given tank shape, the distance measurement from the laser and the angle information from the gimbal must be available. The system then knows when it has to expect a wall and the gimbal needs to move a different tracking pattern to guide the robot.

The camera speed is a crucial performance factor of the system. A standard commercial camera, like a web-camera, offers frame-rates up to 30 frames/s at lower resolutions (e.g. 640×480). More advanced cameras have higher rates with several thousand frames/s [4], offering performance for demanding control, tracking and localization problems.

Figure 6:
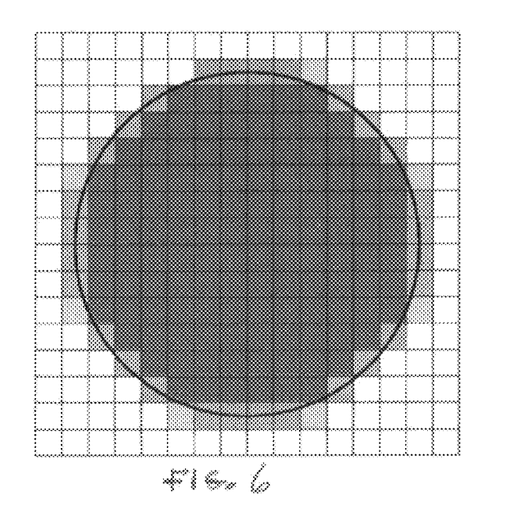
FIG. 6 is an illustration of discretization of a laser spot inside a camera.

The detector plane on top of the robot must have a certain size that depends on the minimum step size of the gimbal system. Based on our previous calculations, a detector screen of size 30 cm×30 cm has been chosen. Since the camera images are not quadratic due to common sensor dimensions, the larger side can be cropped to form a 480×480 image. For simplicity, it has been assumed that the pixels are quadratic and organized side by side, as shown in FIG. 6. At this particular resolution, each pixel covers an area of 0.625 mm². A laser beam with a diameter of 10 mm on the detector screen results in an illuminated area of $\pi r^2 = 78.5$ mm². This area is then covered by around 230 pixels, which is sufficient for recognizing its shape. The covered size of the detector screen can be arbitrarily adjusted by adjusting the distance from the lens to the screen or by using lenses with different focal lengths, keeping in mind that the pixel size scales linearly with the range.

The dynamic range is particularly limited with cameras based on Charge Coupled Devices (CCD) sensors. Lasers are very bright compared to surrounding light conditions, hence the exposure times need to be calibrated accordingly. Exposure times tend to be very short, resulting in high image capture rates. Still useful images can be easily taken with an exposure time of 1/30 s or less. This means, that a frame rate of 30 frames/s or more can be achieved.

As can be seen later in the experiments, background noise does not cause an issue in this setup. The experiments are conducted at artificial lightning conditions, but due to the very short exposure times, everything except the laser spots appears black. Thus, the system is insensitive to background noise.

We will use a red and green laser for tracking and localization. The necessary steps to detect these spots are presented in this section. While the laser beams are hitting the detection screen, they are imaged with the previous described commercially available web-camera. The laser spots, which represent the reference signal for a robot control algorithm, deliver a new value approximately 33 ms each, sufficient for our tracking and control problem.

Figure 7:
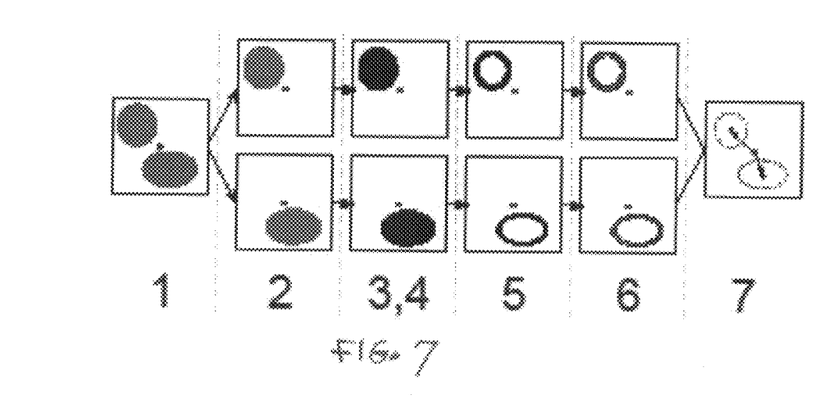
FIG. 7 is an illustration of the principle of the laser spot detection algorithm based on image processing techniques.

Proven and basic image processing algorithms [5] are applied to detect the laser beams shapes and their corresponding center points. In general, the scheme is shown in FIG. 7, where the numbering corresponds to the following steps:
1. Obtaining an image from the camera,
2. Splitting of the image into its different color channels resulting in three 8-Bit gray scale images,
3. Usage of a low pass filter (e.g. Gaussian) to suppress random noise,
4. Forming of a binary image by setting a threshold (all values above or equal the threshold are set to one and zero otherwise),
5. Detection of edges of the binary image (e.g. by a Sobel edge detector), that results in a circle representing the binary spot,
6. Fitting of an ellipse to the data points, giving center, orientation and parameters of the ellipse,
7. Combination of all the data to obtain the desired information for use by the robot control system.

This scheme is repeated after the last step. Since we have chosen a green and a red laser, Step 2 is very convenient, because of the split into Red-Green-Blue (RGB) color channels. As FIG. 7 shows, steps 3 to 6 can be solved in parallel. This offers the use of Field Programmable Gate Arrays (FPGA), that can implement truly parallel executed processes. This is in contrast to microprocessors that can only execute one task at a time, even if programming languages like National Instruments (NI) LabVIEW are used and parallelism is implied. The ellipse fit in step 6 has been chosen for two reasons. First, the circular spot of the green laser will be shaped like an ellipse when the angle between laser system and robot is other than 90°. At 90°, the laser forms a circle, which is a special case of an ellipse. Second, the rectangular beam of the red laser forms similar to an ellipse on the detector screen. Different approaches for fitting ellipses have been developed in the past, such as the method by Taubin [7], a convolution method by Zelniker et al. [8] and The Direct Least Squares Fitting of Ellipses algorithm as described by Fitzgibbon et al. [6]. This work uses the latter, since it is considered more robust and efficient than e.g. the Taubin method. The implicit equation of an ellipse is described as:

$$ax^2+bxy+cy^2+dx+ey+f=0 \quad (5)$$

and the used algorithm estimates the coefficients a, b, c, d, e and f. The algorithm returns the center point in x and y, the radii and the angle that it is tilted. Depending on the controls implementation of the robot, this information can be used for tracking in two ways:
  Taking the absolute values of x and y and subtracting them from the center point coordinates $x_0$ and $y_0$ of the detector screen to obtain the control error $e_x$ and $e_y$. FIG. 4 shows the center point with respect to the red laser spot;
  Convert the laser spot coordinates into polar coordinates. The error e is now delivered through the distance from the center point to the red laser spot, as indicated by the arrow $l_1$ FIG. 4. The angle α (FIG. 4) thus gives the orientation.

Figure 8:
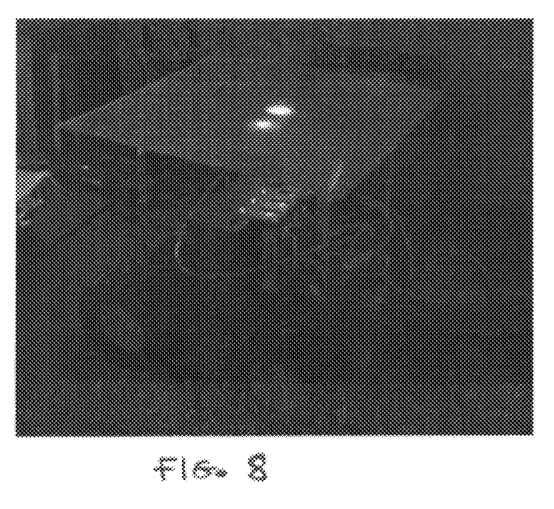
FIG. 8 is a photograph of a prototype mobile robot for use with the present invention.

The experiments are carried out on single images to demonstrate the detection algorithm and its ability to derive the coefficients of ellipses. As for the reasons described earlier, two lasers of two different colors are used, red and green. The red laser is a SICK DT500 with a wavelength of 650 nm that also incorporates a distance sensor. The green laser is a standard laser module from INSTAPARK with a wavelength of 532 nm. Both lasers are fixed to each other and the beams parallel aligned. FIG. 8 shows the prototype mobile robot for the development of the tracking, localizing and controls techniques.

Figure 1:
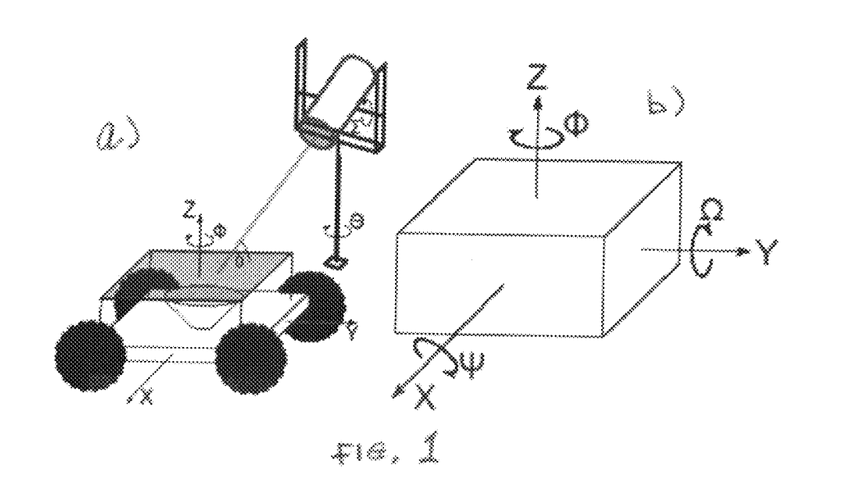
FIG. 1a is a schematic illustration of the laser tracking system disclosed herein indicating the mobile robot platform, gimbal system and laser.
FIG. 1b is a simplified model of a robot with its six degrees of freedom.
Figure 9:
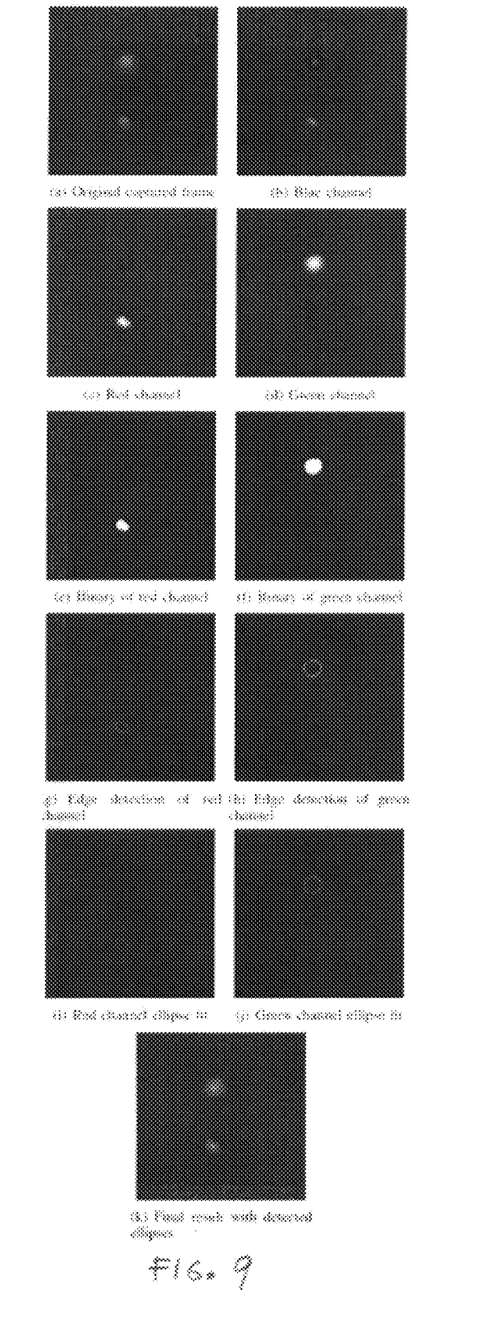
FIGS. 9a-k are illustrations of the processing steps of the algorithm utilized herein.

For the following experiment, the lasers are aligned perpendicular to the detection screen in a distance of 3.8 m (Angle δ in FIG. 1 at 90°). The green laser spot has a diameter of 6 mm on the screen and the red laser forms an ellipse of 4 mm in the major axis and 3 mm in the minor 255 axis. The distance between the two laser beams is 17 mm. FIG. 9 shows a series of images during this process and starts with the original captured image in FIG. 9a. FIG. 9b, FIG. 9c, and FIG. 9d show the blue, red and green channel of the RGB image, respectively. As can be seen, the green and red laser conveniently divide into the respective RGB channels. The blue channel does not contain useful information and is ignored in the further procedure. Following steps are a Gaussian smooth function and conversion into binary images of the red and green channels, as can be seen in FIG. 9e and FIG. 9f. A Sobel edge detector is applied and results in images shown in FIG. 9g and FIG. 9h. Ellipses are fit to the edges of the previous result and both are plotted in FIG. 9i and FIG. 9j.

FIG. 9k combines the original image with the result from the ellipse fit (in yellow color), delivering the center points and coefficients.

Figure 10:
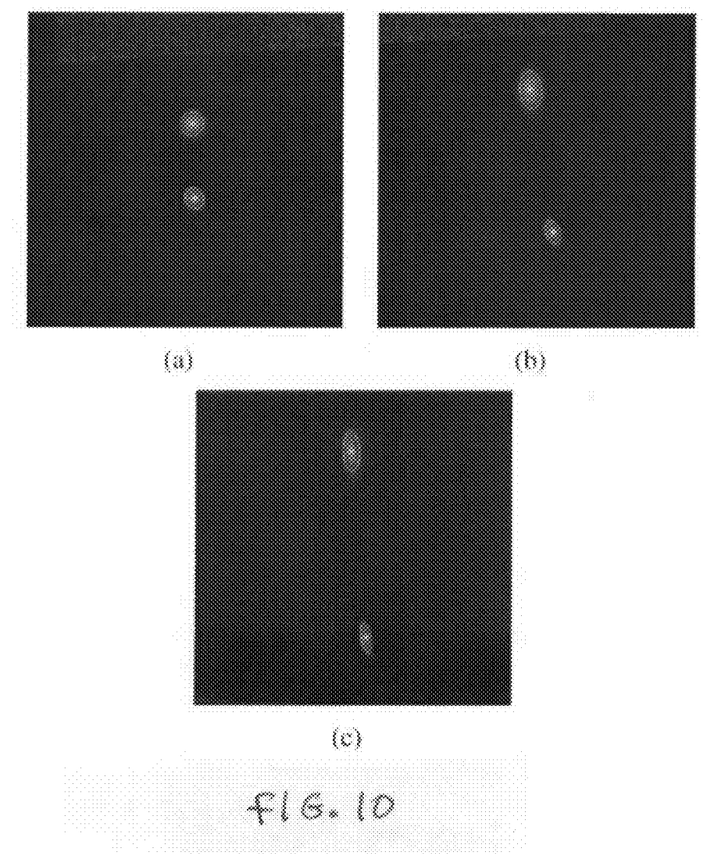
FIGS. 10a-c are photographs showing detection using angles of 45 degrees, 30 degrees and 15 degrees, respectively.

The laser spots are close to circular, but due to the robot's movement, the angle δ is usually different from 90 and ellipses are formed. The following demonstration shows the detection of these shapes and the figures will combine original captured images with the fitting result. In FIG. 10a the laser is aligned at δ=45' with respect to the detector screen. FIGS. 10b and 10c use alignment angles of 30° and 15°, respectively. The images also indicate that the spots are spreading apart from each other due to the decreasing angle δ.

The laser detection system has been implemented using NI LabVIEW 2010 and NI Vision Tool-Box 2010 that is executed on a NI PXI-1042 with build-in NI PXI-8105 Embedded Controller.

This patent application introduces a novel technique in tracking and localization of mobile robots in a hazardous environment, where different techniques cannot or are not allowed to be used. The tracking concept utilizes standard components and proofed detection techniques to find the parameters of laser beam shapes on the robot screen. The choice of red and green lasers turns out to be very handy, since the two lasers can be easily differentiated by splitting the captured images into their RGB color channels. Combining the information of the robot laser 280 detection, the gimbal angles and the laser distance measurement allow local and global localization of the robot in the four DOF X, Y, Z, and Φ.

The references listed herein are incorporated into this patent application by reference.

REFERENCES

[1] Equations of motion for a two-axes gimbal system Yoon, Sugpil; Lundberg, J. B. IEEE Transactions on Aerospace and Electronic Systems, vol. 37, issue 3, pp. 1083-1091, 2001
[2] Robust control for a two-axis gimbaled sensor system with multivariable feedback systems S. B. Kim, S. H. Kim, and Y. K. Kwak, IET Control Theory Appl. 4, 539 (2010), DOI:10.1049/iet-cta.2008.0195
[3] High-performance two-axis gimbal system for free space laser communications onboard unmanned aircraft systems Locke Michael, Czarnomski Mariusz, Qadir Ashraf, Setness Brock, Baer Nicolai, Meyer Jennifer, Semke William H Proceedings of SPIE—The International Society for Optical Engineering [Proc. SPIE Int. Soc. Opt. Eng.]. Vol. 7923, [np]. 2011
[4] High-Speed videography using a dense camera array. Bennett Wilburn, Neel Joshi, Vaibhav Vaish, Marc Levoy, and Mark Horowitz. 2004. In Proceedings of the 2004 IEEE computer society conference on Computer vision and pattern recognition (CVPR'04). IEEE Computer Society, Washington, D.C., USA, 294-301.
[5] Two-Dimensional Signal and Image Processing Jae S. Lim Prentice Hall PTR; Facsimile edition (Sep. 11, 1989) ISBN-10: 0139353224 ISBN-13: 978-0139353222
[6] Andrew W. Fitzgibbon, Maurizio Pilu, and Robert B. Fisher Direct least-squares fitting of ellipses, IEEE Transactions on Pattern Analysis and Machine Intelligence, 21(5). 476-480, May 1999
[7] G. Taubin, "Estimation of Planar Curves, Surfaces, and Nonplanar Space Curves Defined by Implicit Equations with Applications to Edge and Range Image Segmentation," IEEE Transactions on Pattern Analysis and Machine Intelligence, pp. 1115-1138, November, 1991
[8] Maximum-likelihood estimation of circle parameters via convolution E. E. Zelniker, I. V. L. Clarkson Image Processing, IEEE Transactions on In Image Processing, IEEE Transactions on, Vol. 15, No. 4. (2006), pp. 865-876. doi: 10.1109/TIP.2005.863965 Key: citeulike:3979510

What is claimed is:

1. Localization system comprising:
   at least one laser pointing its beam at arbitrary locations within a three-dimensional space;
   an object in the three-dimensional space supporting a screen at its top for receiving the laser beam to create a shaped image on the screen;
   a camera for observing the shaped image on the screen; and
   computing apparatus for determining location of the object in the three-dimensional space from pointing parameters of the laser and from shape and center points of the shaped image on the screen.
2. The system of claim 1 wherein the at least one laser is mounted in a gimbal system having two axes of rotation.
3. The system of claim 1 using two lasers to generate two images having different shapes and/or colors.
4. The system of claim 1 wherein the shaped images are selected from the group consisting of circles, squares, semicircles, and rectangles.
5. The system of claim 1 wherein the object is a mobile robot.
6. The system of claim 1 wherein the computing apparatus fits an expected shape to data points of the shaped image.
7. The system of claim 6 wherein the expected shape is an ellipse.
8. The system of claim 6 wherein the expected shape is a rectangle.

* * * * *